(12) United States Patent
Hansen et al.

(10) Patent No.: US 11,583,784 B2
(45) Date of Patent: Feb. 21, 2023

(54) PLAY SYSTEM AND METHOD FOR DETECTING TOYS

(71) Applicant: LEGO, Billund (DK)

(72) Inventors: Erik Hansen, Billund (DK); Jesper Søderberg, Billund (DK); Thomas Alan Donaldson, Billund (DK)

(73) Assignee: LEGO A/S, Billund (DK)

( * ) Notice: Subject to any disclaimer, the term of this patent is extended or adjusted under 35 U.S.C. 154(b) by 177 days.

(21) Appl. No.: 16/770,815

(22) PCT Filed: Dec. 18, 2018

(86) PCT No.: PCT/EP2018/085414
§ 371 (c)(1),
(2) Date: Jun. 8, 2020

(87) PCT Pub. No.: WO2019/121629
PCT Pub. Date: Jun. 27, 2019

(65) Prior Publication Data
US 2020/0391134 A1 Dec. 17, 2020

(30) Foreign Application Priority Data
Dec. 19, 2017 (DK) .............. PA 201770959

(51) Int. Cl.
*A63H 33/26* (2006.01)
*A63F 9/24* (2006.01)

(52) U.S. Cl.
CPC ............ *A63H 33/26* (2013.01); *A63F 9/24* (2013.01); *A63F 2009/2442* (2013.01)

(58) Field of Classification Search
CPC ....... A63H 33/26; A63H 2200/00; A63F 9/24; A63F 2009/2442; A63F 2003/00665
(Continued)

(56) References Cited

U.S. PATENT DOCUMENTS 6,073,043 A 6/2000 Schneider
6,541,966 B1 4/2003 Keene
(Continued)

FOREIGN PATENT DOCUMENTS

GB 2391315 A 2/2004
WO 2013/160055 A1 10/2013
(Continued)

OTHER PUBLICATIONS

First Search Report and Opinion issued in Danish priority application No. PA 2017 70959, dated May 17, 2018. (9 pages).
(Continued)

*Primary Examiner* — Michael D Dennis
(74) *Attorney, Agent, or Firm* — Day Pitney LLP; Anthony A. Kassas

(57) ABSTRACT

A play system, comprising: one or more toys comprising one or more electrically conductive parts, the one or more conductive parts defining a spatial pattern, the one or more toys having a physical configuration that is modifiable by a user, the spatial pattern being dependent on the physical configuration of the one or more toys, the one or more toys including a first toy; a magnetic field generating device arranged to generate a magnetic field for inducing an eddy current in one or more of the electrically conductive parts; a sensor configured to detect the induced eddy current; and a data processor; wherein the first toy and at least one of the magnetic field generating device and the sensor are movable relative to each other; wherein the sensor is configured to detect the induced eddy current during relative movement between the first toy and at least one of the magnetic field generating device and the sensor, and wherein the data processor is configured to: receive sensor data from the sensor, the sensor data being indicative of the eddy current detected during relative movement between the first toy and (Continued)

at least one of the magnetic field generating device and the sensor, detect the spatial pattern of the electrically conductive parts based at least in part on the received sensor data, determine the physical configuration of the one or more toys based on the detected spatial pattern.

21 Claims, 3 Drawing Sheets

(58) Field of Classification Search
  USPC .......................................................... 446/133
  See application file for complete search history.

(56) References Cited

U.S. PATENT DOCUMENTS

| | | | |
|---|---|---|---|
| 9,144,749 B2* | 9/2015 | Munch | A63H 33/086 |
| 2006/0044094 A1* | 3/2006 | Davis | A63H 33/26 |
| | | | 335/220 |
| 2009/0197658 A1 | 8/2009 | Polchin | |
| 2013/0217294 A1 | 8/2013 | Karunaratne | |
| 2014/0032146 A1 | 1/2014 | Wallace et al. | |
| 2014/0142900 A1* | 5/2014 | Andre | G06F 30/00 |
| | | | 703/1 |
| 2014/0287807 A1 | 9/2014 | Cohen | |
| 2015/0286322 A1* | 10/2015 | Duteil | H04B 5/0062 |
| | | | 345/173 |
| 2017/0144083 A1* | 5/2017 | Kaersgaard et al. | |
| | | | A63H 33/086 |
| 2017/0333803 A1* | 11/2017 | Brandwijk | A63H 33/042 |
| 2018/0280822 A1* | 10/2018 | Murthy | A63H 33/042 |

FOREIGN PATENT DOCUMENTS

| | | |
|---|---|---|
| WO | 2014/167565 A1 | 10/2014 |
| WO | 2016/037977 A1 | 3/2016 |
| WO | 2016/075081 A1 | 5/2016 |
| WO | 2016/099260 A1 | 6/2016 |
| WO | 2016/162403 A1 | 10/2016 |

OTHER PUBLICATIONS

International Search Report and Written Opinion of the International Searching Authority, issued in corresponding International application No. PCT/EP2018/085414, dated Feb. 12, 2019. (11 pages).

International Preliminary Report on Patentability issued in corresponding international application No. PCT/EP2018/085414, dated Feb. 11, 2020. (5 pages).

* cited by examiner

PLAY SYSTEM AND METHOD FOR DETECTING TOYS

CROSS-REFERENCE TO RELATED APPLICATIONS

This application is a U.S. National Stage of International Application No. PCT/EP2018/085414, filed on 18 Dec. 2018 and published on 27 Jun. 2019, as WO 2019/121629 A1, which claims the benefit of priority to Danish Patent Application No. PA 2017 70959, filed on 19 Dec. 2017. The content of each of the above referenced patent applications is incorporated herein by reference in its entirety for any purpose whatsoever.

TECHNICAL FIELD

The present disclosure relates to a play system. The present disclosure further relates to a process for detecting toys and, in particular, for detecting toy construction models constructed from a plurality of toy construction elements.

BACKGROUND

Many toys can be manipulated by users so as to change a shape of the toy. For example, the toy may comprise multiple parts that are movably interconnected with each other such that the user may move the parts relative to each other. Alternatively or additionally, the toy may comprise multiple parts that can be detachably connected to each other. In particular, the toy may be a toy construction model constructed from a plurality of toy construction elements.

In many digital-physical play scenarios it is desirable to recognize a toy by a computer or other data processing apparatus. To this end a variety of techniques have been suggested, including techniques based on image recognition, or by providing toys with visible markers, such as QR codes or AR markers. Examples of such techniques are described in WO2013/160055 and WO2016/075081.

Visual markers have the disadvantage that they affect the appearance of the toy. Image recognition requires suitable lighting conditions and may be unreliable if used in badly illuminated environments. Moreover, vision-based detection methods only allow the detection of visible features.

Other techniques have been suggested that are based on RFID tags, Bluetooth, or other wireless communications techniques, e.g. as described in WO2016/162403 or WO2016/037977. However, these techniques require suitable integrated circuits or other electronic components to be included into the toy. Moreover, while some of these techniques, e.g. Bluetooth communication, require a battery or another form of power supply to be included in the toy, other techniques, e.g. RFID-based systems, require the toy to be brought into close proximity to a reading device so as to allow data transfer between the RFID tag and the reader.

It is thus desirable to provide a method that is insensitive to lighting conditions and does not require data transfer between the toy and a reading device.

It is further desirable to provide a method that allows the toy to be constructed in a relative inexpensive manner and without the risk of interference with normal play activities.

SUMMARY

According to a first aspect, disclosed herein are embodiments of a play system, comprising:

one or more toys comprising one or more electrically conductive parts, the one or more conductive parts defining a spatial pattern, the one or more toys having a physical configuration that is modifiable by a user, the spatial pattern being dependent on the physical configuration of the one or more toys, the one or more toys including a first toy;

a magnetic field generating device arranged to generate a magnetic field for inducing an eddy current in one or more of the electrically conductive parts;

a sensor configured to detect the induced eddy current; and a data processor;

wherein the first toy and at least one of the magnetic field generating device and the sensor are movable relative to each other;

characterized in that the sensor is configured to detect the induced eddy current during relative movement between the first toy and at least one of the magnetic field generating device and the sensor, and that the data processor is configured to:

a) receive sensor data from the sensor, the sensor data being indicative of the eddy current detected during relative movement between the first toy and at least one of the magnetic field generating device and the sensor, b) detect the spatial pattern of the electrically conductive parts based at least in part on the received sensor data, c) determine the physical configuration of the one or more toys based on the detected spatial pattern.

Accordingly, embodiments of the play system utilize the fact that electrically conductive materials exhibit eddy currents in a changing magnetic field. These eddy currents can be detected by a sensor, e.g. as a load modulation of induction of the magnetic field generating device which generates the magnetic field, or by detecting a secondary magnetic field that is generated by the eddy currents. Electrically conductive parts of one or more toys can therefore be detected by generating a magnetic field and by detecting a load modulation or by detecting a change in the generated magnetic field. The data processor may detect positions and/or orientations and/or shapes and/or sizes of the respective electrically conductive parts, thus allowing detection of a spatial pattern defined by one or more of the electrically conductive parts. For example, the magnetic field generating device may scan the generated magnetic field in space or otherwise modulate the generated magnetic field over time and/or in space, and the sensor may detect eddy currents induced by the modulated magnetic field. The processing device detects the physical configuration from the detected spatial pattern.

Consequently, embodiments of the play system allow detection of the physical configuration of the one or more toys independently of lighting conditions and in a safe manner. Moreover, embodiments of the play system disclosed herein allow detection of aspects of the physical configuration that are obstructed from view or otherwise not visible. Furthermore, embodiments of the play system do not require any power source, data storage or integrated circuits to be included in the one or more toy whose physical configuration is to be detected. Hence, the one or more toys do not require any sealing of power sources or electronic components against water or humidity and the one or more toys can be manufactured durable, at low cost and environmentally friendly. Yet further, the toys do not require the inclusion of any parts that are movable relative to the remainder of the toy and can be manufactured in a simple manner. Moreover, the play system allows the physical configuration of the one or more toy to be detected while the one or more toys is/are manipulated by the user at a distance from the sensor and/or from the magnetic field generating device, e.g. moved about a volume of space through which the generated magnetic field extends.

The sensor detects the induced eddy current during relative movement between the first toy and at least one of the magnetic field generating device and the sensor. In some embodiments, the first toy may be movable relative to the sensor and/or relative to the magnetic filed generating device. Alternatively or additionally, the sensor and/or the magnetic field generating device may be movable relative to the first toy. For example, the first toy may be moved about a play area by the user. In particular, the first toy may be a handheld toy. The first toy may be freely, i.e. unconstrained, movable within at least a volume of space relative to the sensor and/or the magnetic field generating device. In other embodiments, movement of the first toy relative to the sensor and/or relative to the magnetic field generating device may be partly constrained, e.g. constrained to a movement in a plane, along a certain direction, within certain boundaries, and/or the like. Generally movement may include a translatory movement and/or a rotational movement of the entire toy or of one or more oarts thereof. Similarly, in some embodiments, the sensor may be movable relative to the first toy and/or relative to the magnetic field generating device. Alternatively or additionally, the magnetic field generating device may be movable relative to the first toy and/or relative to the sensor. As described in connection with the first toy, movement of the sensor and/or of the magnetic field generating device may be free/unconstrained or the movement may be constrained. In particular, in some embodiments, the magnetic field generating device and the sensor may be constrained to be movable only in unison, e.g. as they may be accommodated in the same housing. It will be appreciated that, even in embodiments allowing an otherwise unconstrained movement of one or more of the components of the system, detection of the eddy current may impose certain limitations, e.g. on the relative distance and/or orientations between the toys, the sensor and the magnetic field generating device. For example, while the first toy may be freely movable in space, it may only be detectable by the sensor when it is positioned within a certain detection range from the sensor and the magnetic field generating device. Nevertheless, in some embodiments, the sensor is configured to detect the induced eddy currents while the first toy and, in particular, the electrically conductive part(s) thereof is at a distance—in particular within a detection range—from the sensor and/or from the magnetic field generating device, i.e. without requiring that the first toy touches the sensor and/or the magnetic field generating device. Accordingly the system may determine the physical configuration of the one or more toys as long as the first toy is located within said detection range. For example, the detection range may extend to a distance of at least 1 cm from the sensor and/or from the magnetic field generating device, e.g. at least 5 cm, e.g. at least 10 cm. In some embodiments the detection range is less than 2 m, such as less than 1 m, such as less than 50 cm. Accordingly, embodiments of the play system allow detection of the toy during a variety of game play activities, e.g. while the user manipulates and/or moves a toy around at a distance from the sonsor and/or from the magnetic field generating device.

The detection of eddy currents and the determination of the spatial configuration are not limited to relative movement involving a single toy. In some embodiments, the sensor may be operable to detect eddy currents during relative movement of the first toy and of one or more further toys relative to at least one of the sensor and the magnetic field generating device, and the processor may determine the spatial configuration associated with, or otherwise involving, each of the first toy and the one or more further toys.

Generally, the physical configuration of a toy may be defined by the shape of the toy, e.g. including the relative position of movably interconnected parts of the toy or the shape resulting from an assembly of interconnectable toy construction elements to form a toy construction model whose shape depends on the type, number, and relative position/orientation of the interconnected toy construction elements. The parts may be movably interconnected in different ways such that they are movable relative to each other while remaining connected, e.g. slidably, rotatably, pivotably, hinged, etc. Alternatively or additionally, the physical configuration of two or more toys may be defined by relative positions of the two or more toys relative to each other. The physical configuration of a toy may be manipulated by the user in a variety of ways, e.g. by moving, or causing movement of, the movably interconnected parts relative to each other, or by attaching and/or detaching parts that are detachably attachable to other parts of the toy. The physical configuration of two or more toys may also be manipulated by the user by moving, or causing movement of movably interconnected parts of one or more of the toys relative to each other, by attaching and/or detaching parts that are detachably attachable to other parts of one or more of the toys, by moving the toys relative to each other, etc.

The spatial pattern may be dependent on—and, hence, indicative of—the physical configuration in a variety of ways. In some embodiments, at least one of the one or more toys comprises two or more parts that are movably interconnected relative to each other and each of the movable parts may comprise an electrically conductive part. Accordingly, the spatial pattern may change when the user manipulates/modifies the spatial configuration. For example, movement of the movable parts relative to each other changes the position and/or orientation of the electrically conductive parts relative to each other, thus changing the spatial pattern defined by the electrically conductive parts. The movable parts may be movable relative to each other while remaining connected, i.e. the movable without being disconnected from each other. Alternatively or additionally, the at least one of the one or more toys may comprise two or more parts that are detachably attached to each other, so as to allow the user to selectively attach the two or more detachably attachable parts with each other. Each of the two or more detachably attachable parts may comprise an electrically conductive part. Hence, attachment and detachment of the parts changes the spatial pattern defined by the electrically conductive parts of the two or more detachably attachable parts. Relative movement of movably interconnected parts and/or attachment or detachment of parts may also change the shape and/or size of one or more electrically conductive parts, thus changing the spatial pattern defined by the one or more electrically conductive parts. Generally, the spatial pattern may be defined by the position and/or orientation of different electrically conductive parts relative to each other. Alternatively or additionally, the spatial pattern may be defined by the size and/or shape of one or more of the electrically conductive parts.

In some embodiments, at least one of the one or more toys is a toy construction model constructed from a plurality of toy construction elements of a toy construction system. Toy construction systems often allow a large variety of different toy construction models to be constructed from a limited number of different types of toy construction elements, each toy construction model having a different physical configuration as defined by the spatial arrangement of the toy construction elements within the toy construction model. Therefore, when user-constructed toy construction models are to be used in a digital-physical play experience, e.g. as part of a toy-enhanced digital play system, it may be desirable to provide a mechanism for partly or completely detecting the physical configuration of a toy construction model. To this end, some or all of the toy construction elements may be electrically conductive or comprise one or more respective electrically conductive elements or components, i.e. a toy construction element may be entirely or partially electrically conductive. Hence, some or all of the toy construction elements, or parts thereof, may form electrically conductive parts of a toy construction model, thus allowing detection of a physical configuration of a toy construction model, in some embodiments even including the inner structure of the model. Moreover, as electrically conductive material or elements may be embedded into the toy construction elements, they may be detectable without affecting their visual appearance to the user.

The toy construction elements may comprise coupling members configured to engage coupling members of other toy construction elements of the toy construction system so as to detachably attach the toy construction elements to each other. To this end, the coupling members may utilize different coupling mechanisms, e.g. based on frictional engagement of the coupling members with each other, based on screws, plug-and-socket connections or other forms of mating engagements of cooperating coupling members. The toy construction system may impose limitations on the degrees of freedom of how the toy construction elements may be attached to each other, e.g. by limiting the possible relative positions and/or orientations at which they can be attached to each other. These limitations facilitate the detection of different spatial patterns as the possible resulting spatial patterns of the conductive elements are limited by the limitations of the toy construction system. Hence, there may be a discrete (though possible large) number of possible spatial patterns rather than a continuum of possible spatial patterns. Nevertheless, even a relatively small number of electrically conductive toy construction elements may be sufficient to create a large number of distinct spatial patterns, thus allowing a large variety of spatial configurations to be distinguished from each other.

The physical configuration of the toy construction model may be defined by the shape and size of the toy construction elements that are attached to each other so as to form the toy construction model and/or by their relative positions and orientations. Some or all of the toy construction elements making up a toy construction model may be electrically conductive or comprise an electrically conductive part. Accordingly, it will be appreciated that the spatial patterns defined by the electrically conductive parts may be indicative of the physical configuration to varying degrees, i.e. they may be used to distinguish between different configurations more or less accurately. This may e.g. be dependent on the number of electrically conductive toy construction elements that are included in the model relative to the number of electrically non-conductive toy construction elements. A larger number of electrically conductive toy construction elements may allow for a more fine-grained distinction between different configurations. The level of detail at which different spatial patterns may be distinguished may also depend on the design of the magnetic field generating device and the sensor, e.g. on the number, relative position and orientation of magnetic field generating coils and/or detection coils.

The electrically conductive part of a toy (e.g. the electrically conductive part of a toy construction element) may be an electrically conductive coating, an electrically conductive paint or an electrically conductive material that can otherwise be applied to a surface of the toy, e.g. in a predetermined geometric pattern. Alternatively, electrically conductive parts may be embedded in the toy (e.g. in a toy construction element), e.g. as a separate component or as part of the material from which the toy is manufactured. The electrically conductive material may form a geometric pattern e.g. a 2D or a 3D pattern. The pattern may identify the toy and/or a part of the toy, e.g. a toy construction element. In particular, the pattern may uniquely identify the toy and/or the part of the toy, or the pattern may identify the toy and/or part thereof as a member of a group of toys and/or parts thereof. For example, when the toy comprises a plurality of toy construction elements, some or all of the toy construction elements may comprise electrically conductive material arranged in a geometric pattern that is unique for the toy construction element or for a class of toy construction elements, e.g. toy construction elements sharing one or more predetermined attributes, e.g. the same shape and size.

In some embodiments, the toy construction elements are made from plastics material, e.g. thermoplastic polymers, or from another suitable material. The toy construction elements may e.g. be made by an injection molding process or by another suitable manufacturing process.

Embodiments of toy construction elements may comprise graphite or another electrically conductive material, e.g. embedded in an electrically non-conductive base material such as plastics. Thus, the entire toy construction element or only a part thereof may be electrically conductive, dependent on the distribution of the electrically conductive material within the electrically non-conductive base material. Alternatively or additionally, toy construction elements may be made from metal, e.g. aluminum, or include metal parts or parts from another electrically conductive material. Yet alternatively or additionally, toy construction elements may be provided with an electrically conductive paint or coating that is applied to a surface of the toy construction element, e.g. by a printing process or another suitable process. Yet alternatively or additionally, the toy construction elements may be provided with an adhesive element, such as a sticker, where the adhesive element comprises electrically conductive material, such as an electrically conductive paint, print, ink, substrate or coating. Generally, toys with electrically conductive parts may be provided in an inexpensive manner and the electrically conductive parts do generally not interfere with the play activity of the children. Moreover, the provision of electrically conductive parts does not require expensive materials or materials that may involve child safety issues.

Generally, in some embodiments the electrically conductive part or parts, e.g. the electrically conductive material, may be provided so as to define a geometry which allows detection of a direction, e.g. a planar geometry, a ring-shaped geometry, an elongated geometry or the like. When the electrically conductive part is formed as one or more thin layers (e.g. as a sheet, a coating, a layer of paint, a laminated structure, etc.) the induced eddy currents are strongly dependent on the direction of the applied magnetic field and the secondary magnetic field caused by the induced eddy current also defined a predominant direction, thus allowing an orientation of the electrically conductive part to be detected relative to a reference system defined by the magnetic field generating device. For example, a thin layer may be a layer having a thickness much smaller than the extent of the layer in the plane defined by the layer, e.g. a thickness less than 10%, such as less than 5%, such as less than 1% of the smallest extent of the layer within the plane of the layer.

The magnetic field generating device may be any suitable device configured to generate a magnetic field. In particular, the magnetic field generating device may comprise one or more magnetic field generating lines, e.g. loops or coils, of electrically conductive wire, ribbon, etc. The magnetic field generating device may further comprise a drive circuit configured to energize the one or more magnetic field generating lines so as to create a magnetic field in an environment around the magnetic field generating lines. The generated magnetic field induces eddy currents in the electrically conductive parts of the one or more toys when the one or more toys are in sufficient proximity of the magnetic field generating lines and when the magnetic field that interacts with the electrically conductive parts changes. The eddy currents in turn cause a secondary magnetic field which causes a change in the resulting magnetic field in the vicinity of the one or more toys.

In some embodiments, the magnetic field generating device is configured to generate a time-varying magnetic field, thereby causing eddy currents to be induced even if the one or more toys are stationary, i.e. when the electrically conductive parts are not moved relative to the generated magnetic field.

The magnetic field generating device may be configured to change the spatial configuration of the generated magnetic field over time, e.g. by selectively energizing different ones of a plurality of magnetic field generating lines located at different positions. The magnetic field generating device may be configured to alternatingly generate or otherwise modulate a magnetic field at respective locations relative to a reference coordinate system where the reference coordinate system may be defined by the magnetic field generating device and/or by the sensor. In particular, the magnetic field generating device may be configured to cause the generated magnetic field to scan across a volume of space, thereby allowing detection of the position and/or orientation of the conductive parts. Alternatively or additionally, the magnetic field generating device may be configured to selectively generate the magnetic field at respective field strengths, e.g. so as to selectively detect a spatial pattern of electrically conductive parts at different distances from the magnetic field generating lines and/or to detect a spatial pattern of electrically conductive parts at different spatial resolutions, etc.

Generally, the magnetic field generating device may comprise multiple magnetic field generating lines at different positions and/or oriented in different directions so as to facilitate detection of positions and/or orientations of the electrically conductive parts. In some embodiments, the magnetic field generating lines are arranged such that their respective magnetic fields at corresponding spatial positions are directed along different directions, thus facilitating a more accurate detection of spatial patterns and/or orientation of the electrically conductive parts. In particular, the magnetic field generating lines may be arranged in loops or coils oriented at different angles relative to each other. To this end, each loop or coil may be wound circumferentially around a respective loop or coil axis, and the magnetic field generating device may comprise a plurality of loops or coils arranged such that their respective axes are oriented in different directions, i.e. are not parallel to each other. In some embodiments, some axes may be oriented at angles between 45° and 90° relative to each other, e.g. between 60° and 90°, such as at 90°.

In some embodiments, the sensor comprises one or more detection lines, e.g. loops or coils. The detection lines may be electro-magnetically coupled with the magnetic field generating lines for inducing an electromotive force (i.e. a voltage) in the detection lines indicative of a magnetic flux change caused by the induced eddy currents. The sensor may comprise multiple detection lines at different positions and/or oriented in different directions so as to increase the sensitivity of the sensor to positions and/or orientations of the electrically conductive parts. In particular the detection lines may be arranged in loops or coils oriented at different angles relative to each other. To this end, each loop or coil may be wound circumferentially around a respective loop or coil axis, and the magnetic field generating device may comprise a plurality of loops or coils arranged such that their respective axes are oriented in different directions, i.e. are not parallel to each other. In some embodiments, some axes may be oriented at angles between 45° and 90° relative to each other, e.g. between 60° and 90°, such as at 90°. The number, shape and/or arrangement of detection lines may be different from the number, shape and/or arrangement of magnetic field generating lines. For example, in some embodiments, the magnetic field generating device may comprise multiple magnetic field generating lines, e.g. multiple coils arranged at different positions and/or orientations. The sensor may comprise only a single detection line, e.g. a single coil, or multiple detection lines.

The sensor may comprise a detection circuit, e.g. a signal processing unit, configured to detect the electromotive force induced in the detection lines.

The detection lines may be different from the magnetic field generating lines. In some embodiments the detection lines may be the same as the magnetic field generating lines. For example, multiple lines may alternatingly be operated as magnetic field generation lines and detection lines, respectively. In some embodiments, the sensor utilizes the magnetic field generating lines as they are generating the magnetic field. To this end, the sensor may detect an effect of the induced eddy currents on the circuit that generates the magnetic field, e.g. by detecting changes in the load required to drive generation of the magnetic field, changes in the impedance of the magnetic field generating line and/or another suitable parameter of the magnetic field generating device.

The magnetic field generating lines and/or the detection lines may be embedded in or on one or more mats or plates, or on another suitable support structure, e.g. in a grid across the support structure. In some embodiments one or more coils are arranged in multiple, non-parallel planes, e.g. in respective 2D grids in different planes. In some embodiments the play system comprises a support structure defining two or three mutually orthogonal planes along which the magnetic field generating lines and/or the detection lines are arranged. For example, the support structure may define two sides of a box-shaped space, the two sides defining a common edge at which the sides meet. In some embodiments, the support structure defines three sides of a box-shaped space, the three sides defining a common corner where the three sides meet. In other embodiments the support structure defines a shell or sphere (or a part thereof) on which the magnetic field generating lines and the detection lines are arranged. Generally, the support structure defines a physical play area, e.g. defined by the interior of the sphere or box-shaped space where the user can manipulate the on or more toys while the physical configuration of the one or more toys is being scanned/detected.

In some embodiments the magnetic field generating device and the sensor are embodied as a single apparatus comprising the drive circuit, the magnetic field generating lines, the detection lines and the detection circuit. In particular, the sensor and the magnetic field generating device may be accommodated within a single housing. In some embodiments, the sensor and/or the magnetic field generating device may be accommodated within a toy, e.g. a movable toy such as a handheld toy.

In some embodiments, the magnetic field generating lines and/or the detection line are movably arranged relative to a support structure and/or relative to the one or more toys and/or relative to each other. The movement may be caused by a suitable drive system e.g. powered by a motor or manually by the user. The magnetic field generating lines and/or the detection lines may thus be moved about so as to change the spatial configuration of the magnetic field and/or so as to change the positional and/or orientational sensitivity of the sensor. Accordingly an improved spatial resolution may be achieved with a small number of magnetic field generating lines. Generally, a movable magnetic field generating device and/or sensor may be manually movable or driven by a suitable actuator or motor.

In some embodiments the play system comprises one or more position sensors operable to detect a position (e.g. relative to a fixed coordinate system) of the magnetic field generating device and/or the position of the sensor that detects the induced eddy currents. The one or more position sensors may employ any suitable sensor technology for directly or indirectly determining a position. For example, a position sensor may comprise a magnetic sensor operable detect the magnetic field generated by the magnetic field generating device and determine a position of the magnetic field generating device. The magnetic sensor may e.g. be part of the sensor for detecting the induced eddy currents. Alternatively or additionally, the magnetic field generating device or the sensor for detecting the induced eddy currents may include an accelerometer based on which movements may be detected and positions be calculated. Accordingly, when the play system is configured to determine a current position and/or orientation and/or movement of the magnetic field generating device and/or the sensor for detecting the induced eddy currents, the physical configuration of the one or more toys may be determined not only relative to the magnetic field generating device and/or sensor, but also relative to an external coordinate system. This may be particularly useful, when the magnetic field generating device and/or sensor is movable, e.g. a wand a handheld toy etc. For example, the magnetic field generating device and the sensor for detecting the induced eddy currents may be implemented in a handheld or otherwise movable toy (e.g. a space ship, plane, etc.) The movable toy may then be moved around to different locations (which comprise electrically conductive parts) and determine how it is approaching the electrically conductive part, how close it is to it, and/or the like.

The data processor may be configured to receive sensor data indicative of the induced electromotive force and/or sensor data indicative of the effect of the eddy currents on the circuitry of the magnetic field generating device that generates the magnetic field. In some embodiments, the received sensor data may be pre-processed, i.e. at least some of the processing steps for determining the spatial pattern may be performed by the detection circuit.

The data processor may be configured to process the received sensor data so as to detect the spatial pattern of the electrically conductive parts and/or a change of said spatial pattern and to determine the physical configuration of the one or more toys or a change of the physical configuration based on the detected spatial pattern or change thereof.

The data processor may be integrated into the one or more toys and/or the magnetic field generating device and/or the sensor. Alternatively the data processor may be separate from the one or more toys and/or the magnetic field generating device and/or the sensor. For example, the data processor may e.g. be a portable computer, a tablet computer, a laptop computer, a stationary computer, a portable or stationary game console, a smartphone, or the like. The data processor, the magnetic field generating device and/or the sensor, or parts thereof, may be included in the same data processing device. Alternatively, the magnetic field generating device and/or the sensor, or parts thereof may communicatively be connected to a data processing device which comprises the data processor, e.g. as one or more peripherals to the data processing device. In some embodiments, the data processor comprises a plurality of processing units, either within the same physical device or distributed across multiple devices. For example, the data processor may include a signal processing unit included in the sensor and a data processing unit included in a data processing device. The signal processing unit may perform at least a part of the signal processing for detecting the spatial pattern.

The data processor may be configured to create digital play content responsive to the determined physical configuration, e.g. visible content which may e.g. be displayed on a display device such as a screen, glasses, goggles, etc. Alternatively or additionally, the data processor may create audible content, e.g. via loudspeakers, and/or other user-perceptible output. Alternatively or additionally, the data processor may be configured to transmit information about the determined physical configuration to a remote data processing system, e.g. via a suitable computer network, such as the internet.

For example, the play system may be configured to scan a toy construction model in real time while it is being built and/or otherwise manipulated by a user, e.g. moved, reconfigured, etc. The play system may allow the user to discover the full 3D structure including hidden elements of the toy construction model. To this end, the data processor may be configured to create and present a digital representation, e.g. a digital 3D model, of the toy construction model, including a representation of the determined physical configuration.

In some embodiments, the data processor may be configured to distinguish, based on respective detected spatial patterns of electrically conductive parts of the toy construction models, between different toy construction models constructed from the toy construction elements. In some embodiments, the data processor may be configured to distinguish stages of a construction process of constructing a toy construction model from toy construction elements. Again, the distinction is made based on respective detected spatial patterns of electrically conductive parts of the toy construction models. In some embodiments the data processor may be configured to detect and recognize the physical configuration of multiple toys concurrently.

In some embodiments, the processor is configured to recognize the first toy based on the detected spatial pattern, i.e. to determine a first toy identifier indicative of the first toy based at least in part on the received sensor data. Accordingly, the processor may be configured to distinguish between multiple toys of a play system. To this end, different toys may each include one or more electrically conductive parts forming respective spatial patterns, where each spatial pattern is associated with the identity of a respective toy. It will be appreciated that the play system may include a plurality of toys, each including one or more electrically conductive parts, and the processors may be configured to recognize each of the plurality of toys based on the detected sensor data. In some embodiments, the processor may be configured to recognize the identity of the first toy and determine which of a number of possible different spatial configurations the first toy is in. Alternatively or additionally, the processor may be configured to recognize the identities of each of a plurality of toys (e.g. including the first toy) and determine a spatial configuration defined by the plurality of toys.

The detection of eddy currents and the recognition of toys are not limited to relative movement involving a single toy. In some embodiments, the sensor may be operable to detect eddy currents during relative movement of the first toy and of one or more further toys relative to at least one of the sensor and the magnetic field generating device and the processor may determine the respective identities of each of the first toy and the one or more further toys.

Accordingly, according to a second aspect, a play system comprises:
- a first toy comprising one or more electrically conductive parts;
- a magnetic field generating device arranged to generate a magnetic field for inducing an eddy current in one or more of the electrically conductive parts;
- a sensor configured to detect the induced eddy current; and
- a data processor;
- wherein the first toy and at least one of the magnetic field generating device and the sensor are movable relative to each other;
- characterized in that the sensor is configured to detect the induced eddy current during relative movement between the first toy and at least one of the magnetic field generating device and the sensor; and wherein the data processor is configured to:
  a) receive sensor data from the sensor, the sensor data being indicative of the detected eddy current, detected during relative movement between the first toy and at least one of the magnetic field generating device and the sensor;
  b) determine a first toy identifier indicative of the first toy based at least in part on the received sensor data.

The present disclosure relates to different aspects including the play system according to the first and second apsects described above and in the following, corresponding apparatus, systems, methods, and/or products, each yielding one or more of the benefits and advantages described in connection with one or more of the other aspects, and each having one or more embodiments corresponding to the embodiments described in connection with one or more of the other aspects and/or disclosed in the appended claims.

In particular, described herein are embodiments of a computer-implemented method of detecting a physical configuration of one or more toys that can be manipulated by a user, the one or more toys comprising one or more electrically conductive parts, the one or more electrically conductive parts defining a spatial pattern, the one or more toys having a physical configuration that is modifiable by a user, the spatial pattern being dependent on the physical configuration of the one or more toys, the one or more toys including a first toy; the method comprising:

a) receiving sensor data from a sensor, the sensor data being indicative of a detected eddy current induced in one or more of the electrically conductive parts by a magnetic field generated by a magnetic field generating device, the eddy current being detected during relative movement between the first toy and at least one of the magnetic field generating device and the sensor;

b) detecting the spatial pattern of the electrically conductive parts based at least in part on the received sensor data, c) determining the physical configuration of the one or more toys based on the detected spatial pattern.

According to another aspect, a computer-implemented method of recognizing a first toy, the first toy comprising one or more electrically conductive parts, comprises:

a) receiving sensor data from a sensor, the sensor data being indicative of a detected eddy current induced in one or more of the electrically conductive parts by a magnetic field generated by a magnetic field generating device, the eddy current being detected during relative movement between the first toy and at least one of the magnetic field generating device and the sensor; and b) determining a first toy identifier indicative of the first toy based at least in part on the received sensor data.

According to one aspect, a data processor is configured to perform the steps of an embodiment of any of the methods disclosed herein. In particular, the data processor may have stored thereon a computer program, the computer program comprising computer-executable instructions which, when executed by the data processing system, cause the data processing system to perform an embodiment of a process described herein. In some embodiments some or all of the steps are implemented by hardware, e.g. by an application-specific integrated circuit. The data processor may comprise a central processing unit of a suitably programmed stationary or portable computer, such as a laptop computer, a handheld computer, e.g. a tablet computer or a smartphone.

According to yet another aspect, a computer program product comprises a computer program which, when executed by one or more data processors, causes the data processor to perform an embodiment of a process described herein. In particular, the computer program comprises program code adapted to cause, when executed by a processing device, the processing device to perform one or more of the methods described herein. The computer program product may be embodied as a tangible computer-readable medium, such as a CD-ROM, DVD, optical disc, memory card, flash memory, magnetic storage device, floppy disk, hard disk, etc. having stored thereon the computer program. In other embodiments, a computer program product may be provided as a downloadable software package, e.g. on a web server for download over the internet or other computer or communication network, or as an application for download to a mobile device from an App store.

According to yet another aspect, disclosed herein is a kit of parts comprising:
- a plurality of toy construction elements of a toy construction system, including at least a subset of toy construction elements that each include at least a respective electrically conductive part;
- a magnetic field generating device;
- a sensor; and
- a computer program product as disclosed herein or instructions to retrieve such a computer program, e.g. from an App store or a webserver. The instructions may include a pointer to, e.g. an address of, a data storage, a web service or another location from which the computer program may be retrieved.

Additional features and advantages will be made apparent from the following detailed description of embodiments that proceeds with reference to the accompanying drawings.

BRIEF DESCRIPTION OF THE DRAWINGS

Embodiments of the various aspects disclosed herein will be described in more detail in connection with the appended drawings, where.

DETAILED DESCRIPTION

Figure 1:
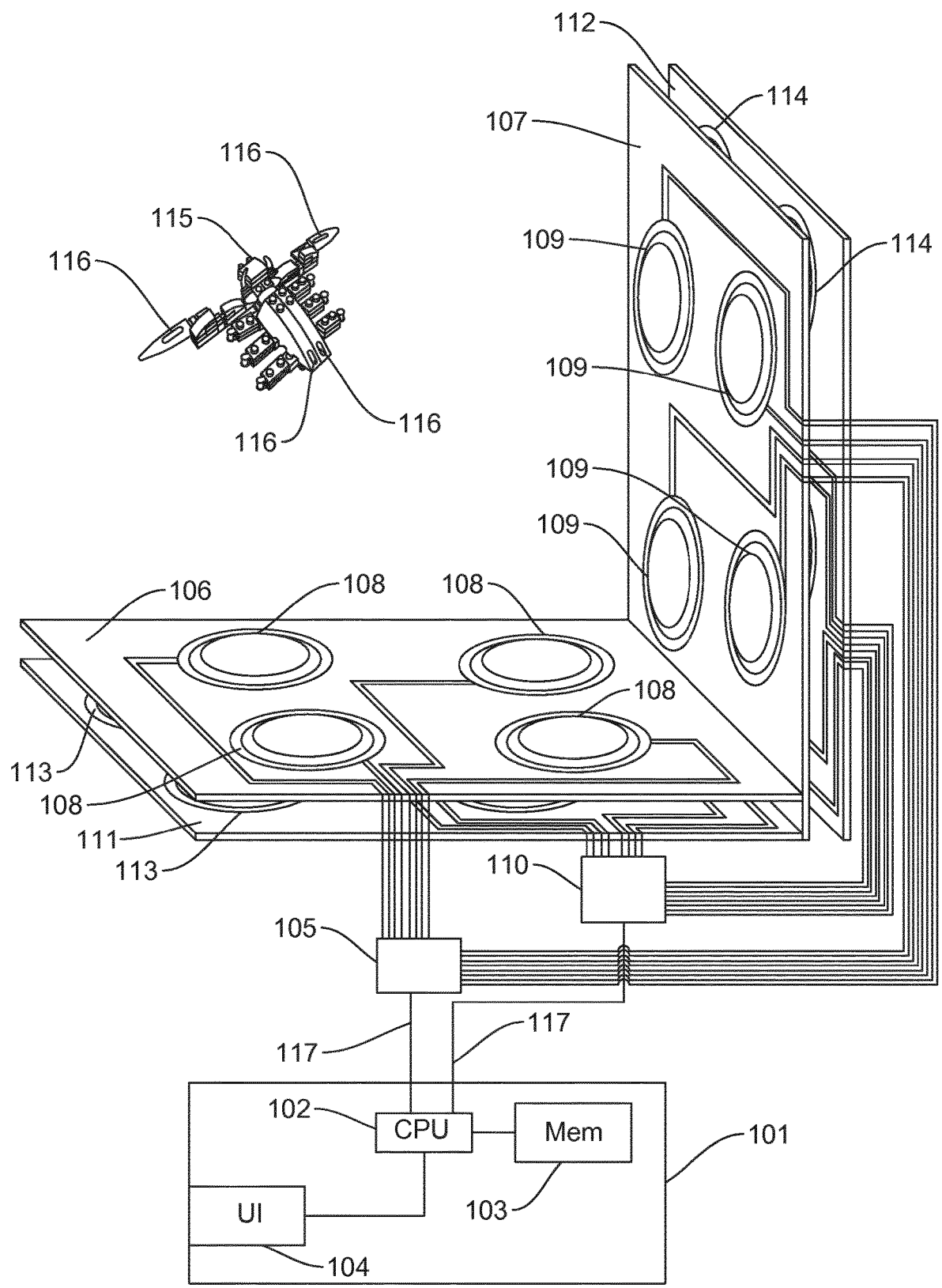
FIG. 1 shows a schematic view of an example of a play system.

FIG. 1 shows a schematic view of an example of a play system. The play system comprises a data processing device 101, a toy construction model 115, a magnetic field generating device and a sensor.

The data processing device 101 may be a suitably programmed stationary or portable computer, such as a laptop computer, a handheld computer, e.g. a tablet computer or a smartphone. The data processing device comprises a processing unit 102, such as a central processing unit (CPU), a memory 103 and a user-interface 104, both operatively connected to the processing unit. The memory may be any suitable memory for storing a computer program and/or data for use by the processing unit when performing a method as described herein. The processing unit 102 may be adapted to execute the program stored in memory 103. The user interface 104 may include a display, an audio output device or another suitable circuitry or device for generating user-perceptible output. The user-interface 104 may further comprise a keyboard, a computer mouse, a touch screen, and/or another device or circuitry for receiving user input. The data processing device 101 further comprises one or more interfaces 117 for communicatively coupling the magnetic field generating device and the sensor to the computer. The one or more interfaces 117 may be wired or wireless interfaces, e.g. a USB interface, a Bluetooth interface or an interface using another suitable data communications technology.

The toy construction model 115 is constructed from a plurality of toy construction elements. In this example, the toy construction elements are of the type available under the name LEGO. However, in other embodiments, the toy construction model may be made from another type of toy construction elements, or the play system may comprise a different type of toy that can be manipulated by a user.

In this example, the toy construction model 115 comprises toy construction elements made from an electrically non-conductive material such as plastic. The toy construction model 115 further comprises some toy construction elements which include an electrically conductive part 116 or which are made entirely from electrically conductive material. The electrically conductive parts 116 form a spatial pattern defined by their relative positions relative to each other, e.g. their respective distances from each other and/or their respective orientations relative to each other. In other embodiments, all toy construction elements of the toy construction model are electrically conductive or comprise an electrically conductive part.

The toy construction model may have parts that are moveable relative to each other so as to alter the physical configuration of the toy construction model. For example, the toy construction model may comprise a main body and a number of appendences attached to the main body such that they can be moved relative to a main body. The physical configuration of the toy construction model 115 may also be altered by adding further toy construction elements and/or by removing toy construction elements, e.g. by detaching a toy construction element and by re-attaching it at a different position and/or orientation.

The magnetic field generating device comprises a driver circuit 105 and magnetic field generating coils 108 and 109 mounted on plates 106 and 107, respectively. The plates 106 and 107 are arranged at a right angle relative to each other. More particularly, they define two sides of a box-shaped volume. Each plate comprises a plurality of magnetic field generating coils 108 and 109, respectively. In the example of FIG. 1 four coils are depicted on each plate. The coils on each plate are arranged on a regular grid. However, it will be appreciated that other embodiments may comprise a different number and/or a different distribution/arrangement of coils.

Each magnetic field generating coil 108, 109 is electrically connectable to the driver circuit 105. The driver circuit is configured to energize the coils in a time-varying manner, e.g. by selective energizing the coils, e.g. in a predetermined recurrent sequence, or to otherwise modulate the generated magnetic field over time. In some embodiments the driver circuit is configured to energize multiple coils concurrently, e.g. by modulating the current through each coil in a periodic way, e.g. such that the electrical current through different coils is modulated at respective frequencies and/or phases. In any event, when a coil is energized, i.e. when an electrical current flows through the windings of a coil, the coil generates a magnetic field extending out of the plates and into the box-shaped volume defined by the plates.

The coils 108 on plate 106 create a magnetic field which, in the area surrounded by a coil, projects out of the plate 106 at a direction predominantly normal to the plane of the plate 106. Similarly, the coils 109 on plate 107 create a magnetic field which, in the area surrounded by a coil, projects out of the plate 107 at a direction predominantly normal to the plane of the plate 107. Hence the direction at which the magnetic field projects from the interior of coils 108 is generally orthogonal to the direction at which the magnetic field projects from the interior of coils 109. The magnetic field generated by the respective coils 108 and 109 thus extends into the box-shaped volume defined by the plates 106 and 107.

When the toy construction model 115 is moved about within the box-shaped volume defined by the plates 106 and 107, e.g. when the toy construction model is held and manipulated by a user, and moved about within the box-shaped volume, the electrically conductive parts 116 interact with the magnetic field generated by the respective magnetic field generating coils. The magnetic field thus induces eddy currents in the electrically conductive parts when the magnetic field at the respective electrically conducting parts 116 changes. The eddy currents depend on the position and orientation of the electrically conductive parts within the box-shaped volume and on how the toy construction model is manipulated. The eddy currents also depend on how the magnetic field at the position of the respective electrically conductive parts varies over time. In particular, the magnetic field at a magnetically conductive part may vary due to a movement of the electrically conductive part relative to the coils 180, 109 (e.g. when the user manipulates the toy construction model) when the magnetic field is inhomogeneous. Alternatively or additionally, the magnetic field experienced by a conductive part 116 may vary due to changes of the magnetic field responsive to the time-varying energizing of the coils 108, 109. In any event, the induced eddy currents generate a secondary magnetic filed, i.e. they affect the overall resulting magnetic field in the box-shaped volume.

The effect of the induced eddy currents is detectable by the sensor, i.e. the sensor may detect the eddy currents from the effect of the eddy currents on the overall magnetic field. To this end, the sensor comprises a signal processing unit 110 or other detection circuit, and magnetic field detection coils 113 and 114. The detection coils are mounted on respective plates 111 and 112, respectively, and they are each electrically connected to the signal processing unit 110. The plates 111 and 112 are arranged parallel to plates 106, 107, respectively, such that they define two sides of the box-shaped volume within which the magnetic field is generated by the magnetic field generating device. Each of the plate 111 and 112 comprises a plurality of detection coils 113 and 114, respectively. In the example of FIG. 1 four coils are depicted on each plate. The coils on each plate are arranged on a regular grid. However, it will be appreciated that other embodiments may comprise a different number and/or a different distribution/arrangement of detection coils. In some embodiments, the magnetic field generation coils and the detection coils may be arranged on the same plates. In some embodiments, some or all coils may even be operable as both detection coils and magnetic field generation coils. For example, a coil may alternatingly be operated as a detection coil and a magnetic field generating coil, e.g. as a part of a sequential activation cycle. In some embodiments, some or all coils may even simultaneously be operable as magnetic field generation coil and detection coil, e.g. when the signal processing unit is configured to detect the effect of the induced eddy currents on the magnetic field generating coils themselves.

In any event, changes of the magnetic field within the box-shaped volume are detected as a change in the electromotive force induced in the detection coils 113 and 114.

Accordingly, the signal processing unit 110 detects these changes and forwards a corresponding sensor signal to the data processing device 101. The data processing device 101 is programmed to process the detected changes in the electromotive forces and to determine the positions of the electrically conductive parts 116, and changes in the positions. From the detected positions, the computer can recognize the toy construction model and/or track movement of the toy construction model within the box-shape volume and/or track other manipulations of the toy construction model. For example, the data processing device may track relative movements of parts of the toy construction model relative to each other when such movement results in a change of the spatial pattern formed by the electrically conductive parts 116. In some embodiments, the computer may be configured to detect added and/or removed electrically conductive parts, e.g. when further toy construction elements are added to, or removed from, the toy construction model. In some embodiments, the data processing device may even be configured to detect a shape and/or size and/or orientation of individual ones of the electrically conductive parts 116. The recognition of spatial patterns and the association of different spatial patterns with respective toy construction models and/or with specific manipulations of the toy construction model may be based on a database of known spatial patterns and known modifications of spatial patterns. The database may associate different spatial patterns with respective toy identifiers, each toy identifier identifying a toy construction model. The database may further store configuration identifiers representing respective spatial configurations of a toy construction model. The database may thus associate different spatial patterns with respective toy identifiers and respective configuration identifiers, thus associating each spatial pattern with a toy construction model and with a spatial configuration of said model. For example, such a database may be stored in the memory 104 of the data processing device or otherwise be accessible to the data processing device. It will be appreciated that at least some of the processing of the detected changes in electromotive forces may be performed by the signal processing unit 110 instead of the data processing device.

The data processing device 101 may be configured to implement various forms of digital play responsive to the detection of the physical configuration of the toy construction model 115. For example, the data processing device may create a digital representation of the toy construction model 115 on a display, e.g. including a representation of the detected movements or other manipulations of the toy construction model. Other examples of digital play may include the presentation of guidance as to how to construct, modify or otherwise manipulate a toy construction model.

In some embodiments the driver circuit 105 and the signal processing unit 110 are integrated into a single control module. It will be appreciated that, in some embodiments, the data processing device 101 and the magnetic field generation device and/or the sensor may be integrated into a single apparatus. In other embodiments, the magnetic field generating device and/or the sensor may be separate devices that are communicatively coupled with each other. In some embodiments, the magnetic field generating coils 108, 109 and/or the detection coils 113, 114 may be replaced by other forms of magnetic field generation lines and/or detection lines, e.g. by single windings, by a meandering pattern of a conductors etc. Yet further, the magnetic field generating coils or lines may be arranged in more than two planes, e.g. in three mutually orthogonal planes, so as to provide an improved spatial resolution. Nevertheless, a simpler and compact implementation may be implemented as a single plate or mat, or even as a handheld device. In yet alternative embodiments, the magnetic field generating coils and/or the detection coils may be arranged in other spatial configurations, e.g. on a sphere or other surface.

Figure 2:
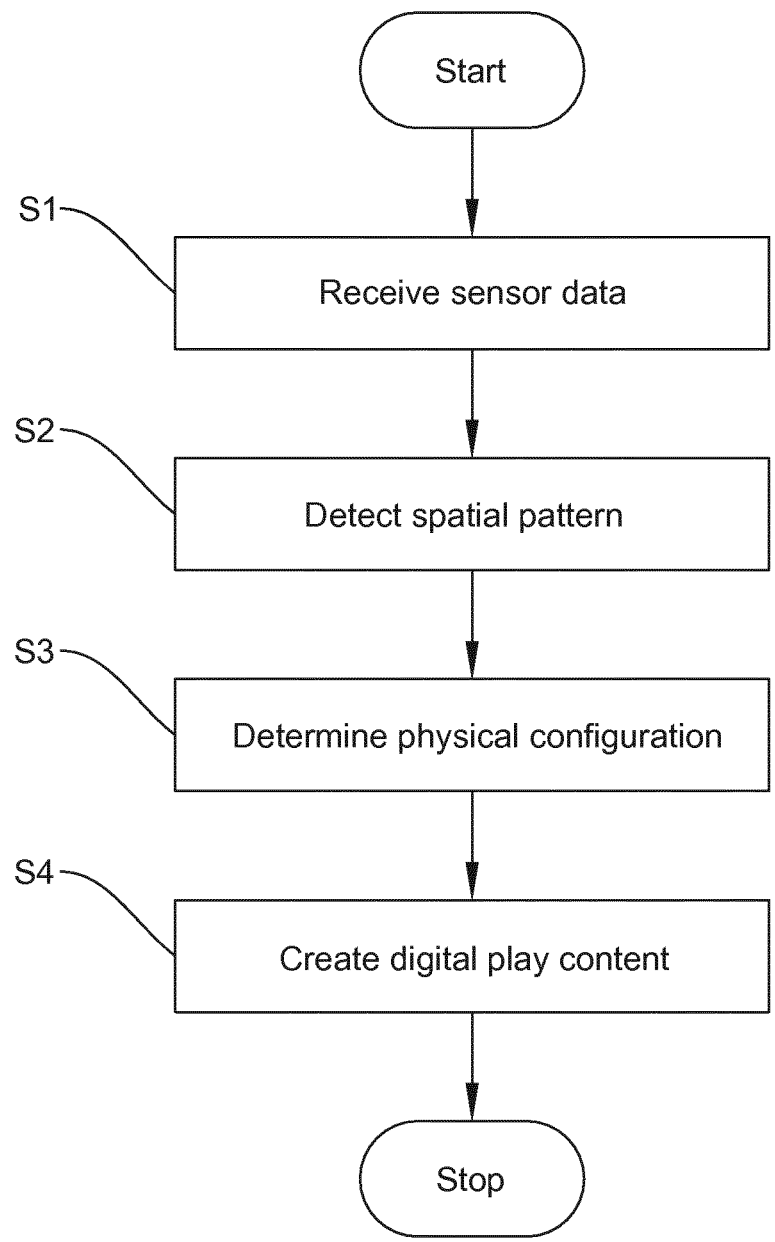
FIG. 2 shows a schematic flow diagram of an example of a process for detecting a physical configuration of a toy.

FIG. 2 shows a schematic flow diagram of an example of a process for detecting a physical configuration of one or more toys. For example, the process of FIG. 2 may be carried out by the data processing device 101—optionally in cooperation with the signal processing unit 110—of the play system of FIG. 1 or by another embodiment of a play system disclosed herein. In step S1, the process receives sensor data indicative of the detected eddy currents that have been induced in electrically conductive parts of a toy by a magnetic field, as the toy is moved about and/or manipulated within a detection range of the sensor and/or the magnetic field generating device. In particular, the sensor data may be indicative of an effect the eddy currents have on the magnetic field. The effect may be detected by a set of detection coils or by another magnetic field detection device. In step S2 the method processes the received sensor data so as to detect the spatial pattern of the electrically conductive parts. For example, the detection may be performed based on known magnetic signatures of known spatial patterns. The known magnetic signatures may e.g. have been established during a training phase. In some embodiments, the patterns may be detected by an adaptive mathematical model, e.g. a neural network or another suitable model. The training patterns may e.g. include magnetic responses of known spatial patterns at different positions and/or orientations.

It will be appreciated that, in some embodiments, the received sensor data may be pre-processed, i.e. some of the steps for detecting the spatial pattern may already have been performed, e.g. by the sensor that detects the effects of the eddy currents. In step S3, the process determines a physical configuration of the toy from the detected spatial pattern and/or changes to the physical configuration. For example, the physical configuration may include the relative position of movable parts of the toy or relative positions of parts making up the toy.

In step S4, the process creates play content responsive to the detected physical configuration. For example, the process may present a virtual representation of the detected physical configuration of the toy or otherwise create play content responsive to the detected physical configuration.

For example, the physical toy may be assembled from multiple toy construction elements, at least some of which comprise respective element-specific spatial patterns (a "magnetic signature") of electrically conductive material. The process may thus detect the respective induced eddy currents from the different toy construction elements by analyzing the sensor data of each of the sensors in the system—e.g. from different angles. Using e.g. triangulation, the process may then identify location and rotation in 3D space of the respective spatial patterns. By processing the spatial pattern of each of the detectable toy construction elements in the model, the process may reconstruct a digital version of the model using pre-known information about each toy construction element. For example, for each of the detectable toy construction elements, the system may have stored the full 3D mesh or other 3D representation, where all connectors (with which the toy construction element can be connected to other toy construction elements of the system) are placed on the mesh and where the spatial pattern is placed. Using that information, the most likely model consistent with the received sensor data may be computed in an iterative process where possible irregularities in the scan result are fixed. This may be done by detecting the respective positions and orientations of each detectable toy construction element in 3D space and by calculating how the connectors of the different elements may be interconnected and while making sure that the mesh of the elements is not colliding.

Embodiments of a play system described herein may be used in a variety of ways e.g. as described below:

In some embodiments, a play system may allow a user to use a toy as a controller in a digital experience. For example, when the user moves the toy relative to the sensors, the detected movement may be used by the play system to control a corresponding virtual version of the toy in a virtual environment.

In some embodiments, the play system is configured to detect the composition of a modular model and creates a corresponding virtual model that may be used in a digital experience.

In some embodiments, the play system may detect the positions and/or orientations of two or more toys relative to each other. For example, the play system may detect whether a physical figurine is placed inside or outside of an enclosure, e.g. a toy model of a house. The two or more toys may be separate from each other, i.e. unconnected from each other. In particular, they may be movable relative to each other, e.g. freely movable from each other and/or movable at a distance from each other. Depending on the relative positioning, the play system may trigger respective events in a digital experience, e.g. playing sounds, displaying content, etc.

Figure 3:
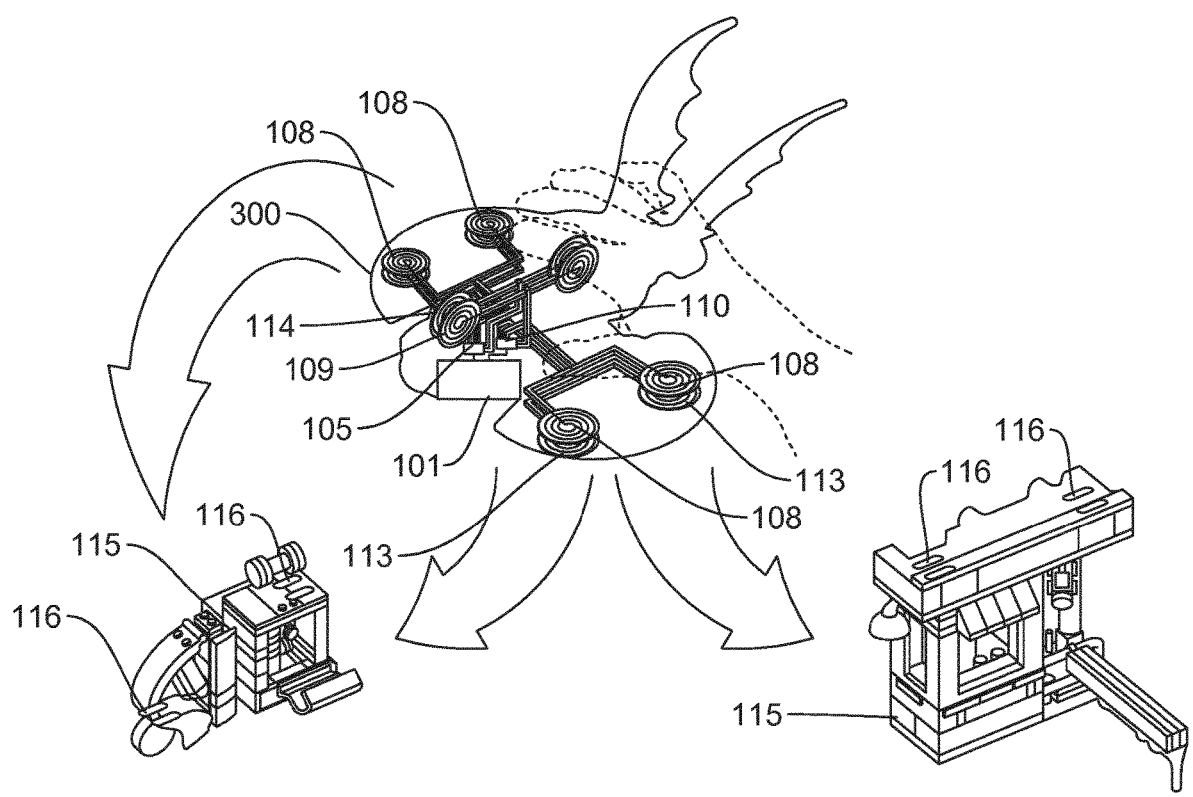
FIG. 3 shows a schematic view of another example of a play system.

FIG. 3 shows a schematic view of another example of a play system. The play system comprises a movable toy 300 and a number of additional toys 115. In the example of FIG. 3, the movable toy 300 is a handheld toy that comprises a main body which resembles an airplane. It will be appreciated, however, that other examples of a movable toy may have a different shape, e.g. resembling another type of vehicle, or a creature, etc. Similarly, other examples of a movable toy need not necessarily be handheld. The movable toy 300 comprises a processing unit 101, a magnetic field generating device and a sensor disposed within the main body.

The data processing unit 101 may be suitably programmed or otherwise configured to perform an embodiment of the method described herein. The data processing unit may comprise a memory for storing a computer program and/or data for use by the processing unit when performing a method as described herein. The data processing unit 101 further comprises one or more interfaces for communicatively coupling the magnetic field generating device and the sensor to the processing unit 101. The processing unit may comprise one or more user interfaces for providing user-perceptible outputs and/or a communications interface for communicatively coupling the processing unit to an external data processing device. The communications interface may be wired or a wireless interface, e.g. a USB interface, a Bluetooth interface or an interface using another suitable data communications technology.

The one or more additional toys 115 may be respective toy construction models each constructed from a plurality of toy construction elements, e.g. as described in connection with the toy construction model of FIG. 1 Each toy construction model 115 comprises some toy construction elements which include an electrically conductive part 116 or which are made entirely from electrically conductive material, all as described in connection with FIG. 1. The electrically conductive parts define a spatial pattern that depends on the physical configuration of the toy construction models 115, i.e. on the relative positions and orienations of the toy construction models relative to each other and/or on the physical configuration of the individual toy construction models.

The magnetic field generating device of the movable toy 300 comprises a driver circuit 105 and magnetic field generating coils 108 and 109 disposed within the main body of the movable toy 300. The field generating coils may be arranged on respective sides or surfaces of the main body, e.g. such that different coils are oriented at different angles relative to each other. Each magnetic field generating coil 108, 109 is electrically connectable to the driver circuit 105. The driver circuit is configured to energize the coils in a time-varying manner, such that they each create a magnetic field, all as described in connection with FIG. 1.

When the movable toy 300 is positioned within a proximity to one or more of the toy construction models 115, e.g. when the movable toy 300 is held and manipulated by a user, e.g. moved about in a proximity of the toy construction models 115, the electrically conductive parts 116 interact with the magnetic field generated by the respective magnetic field generating coils. The magnetic field thus induces eddy currents in the electrically conductive parts when the magnetic field at the respective electrically conducting parts 116 changes. The eddy currents depend on the position and orientation of the movable toy 300 relative to the electrically conductive parts 116. The eddy currents also depend on how the magnetic field at the position of the respective electrically conductive parts varies over time. In particular, the magnetic field at a magnetically conductive part may vary due to a movement of the electrically conductive part relative to the coils 180, 109 (e.g. when the user manipulates the movable toy) when the magnetic field is inhomogeneous. Alternatively or additionally, the magnetic field experienced by a conductive part 116 may vary due to changes of the magnetic field responsive to the time-varying energizing of the coils 108, 109. In any event, the induced eddy currents generate a secondary magnetic filed, i.e. they affect the overall resulting magnetic field in a proximity of the movable toy 300.

The effect of the induced eddy currents is detectable by the sensor of the movable toy 300, i.e. the sensor may detect the eddy currents from the effect of the eddy currents on the overall magnetic field. To this end, the sensor comprises a signal processing unit 110 or other detection circuit, and magnetic field detection coils 113 and 114. The detection coils are disposed within the main body of the movable toy 300 and they are each electrically connected to the signal processing unit 110. The magnetic field detection coils may be arranged such that they are oriented at different angles relative to each other, all as described in connection with FIG. 1.

In any event, changes of the magnetic field in the proximity of the movable toy 300 are detected as a change in the electromotive force induced in the detection coils 113 and 114. Accordingly, the signal processing unit 110 detects these changes and forwards a corresponding sensor signal to the data processing unit 101. The data processing unit 101 is programmed to process the detected changes in the electromotive forces and to determine the positions of the electrically conductive parts 116 relative to the movable toy 300 and/or each other, and changes in the relative positions. From the detected positions, the processing unit 101 can recognize the toy construction model(s) 115 and/or track movement of the movable toy 300 relative to the toy construction model(s) 115 and/or track movements of the toy construction models 115 relative to each other.

In some embodiments, the data processing unit may be configured to detect added and/or removed electrically conductive parts, e.g. when further toy construction models are added/removed or when toy construction elements are added to, or removed from, a toy construction model. In some embodiments, the data processing unit may even be configured to detect a shape and/or size and/or orientation of individual ones of the electrically conductive parts 116. The recognition of spatial patterns and the association of different spatial patterns with respective toy construction models and/or with specific manipulations of the toy construction models may be based on a database of known spatial patterns and known modifications of spatial patterns. For example, such a database may be stored in the memory 104 of the data processing unit or otherwise be accessible to the data processing unit. It will be appreciated that at least some of the processing of the detected changes in electromotive forces may be performed by the signal processing unit 110 instead of the data processing unit and or by an external data processing device with which the data processing unit is communicatively connected.

The data processing unit 101 may be configured to implement various forms of digital play responsive to the detection of the physical configuration of the toy construction model 115 and/or communicate information about the detected toy construction smodels and/or relative position to an external data processing device which may be configured to implement a play pattern responsive to the communicated information.

Although the invention has been described with reference to certain specific embodiments, various modifications thereof will be apparent to those skilled in art without departing from the spirit and scope of the invention as outlined in claims appended hereto.

The invention claimed is:

1. A play system for determining a user-modified configuration of a toy, comprising:
   one or more toys each comprising one or more electrically conductive parts, the one or more toys each having a physical configuration and location that is modifiable by a user, the one or more toys including: a first toy;
   a magnetic field generating device comprising a first and second plane arranged perpendicular to each other, each of the first and second plane projecting a magnetic field from a coil, therefore generating a magnetic field emanating in two dimensions, the magnetic field for inducing an eddy current in one or more of the electrically conductive parts of the one or more toys;
   a sensor configured to detect the induced eddy current on the one or more electrically conductive parts of the one or more toys during relative movement between the first toy and the magnetic field generating device; and
   a data processor
   configured to:
   a) receive sensor data from the sensor, the sensor data being indicative of the eddy current detected during relative movement between the first toy and the magnetic field generating device,
   b) determine a spatial pattern of the electrically conductive parts based on the received sensor data, and
   c) determine the physical configuration of the one or more toys based on the detected spatial pattern.

2. The play system according to claim 1, wherein at least one of the one or more toys is a toy construction model constructed from a plurality of toy construction elements of a toy construction system, the toy construction elements being configured to be detachably attached to each other so as to form a user-constructed toy construction model; and wherein at least some of the toy construction elements are at least partially electrically conductive.

3. The play system according to claim 2, wherein the toy construction elements comprise coupling members configured to engage coupling members of other toy construction elements of the toy construction system so as to detachably attach the toy construction elements to each other in a predetermined variety of relative positions and orientations.

4. The play system according to claim 1, wherein one or more of the electrically conductive parts are formed as one or more conductive layers defining a detection plane.

5. The play system according to claim 1, wherein the magnetic field generating device is configured to generate a time-varying magnetic field.

6. The play system according to claim 5, wherein the magnetic field generating device is configured to alternatingly generate a magnetic field at respective locations relative to a reference system.

7. The play system according to claim 1, herein the magnetic field generating device comprises one or more magnetic field generating lines and a drive circuit configured to energize the one or more magnetic field generating lines for generating the magnetic field and wherein the sensor comprises a detection circuit and, optionally, one or more detection lines; wherein the detection circuit is configured to detect an induced electromotive force in the one or more detection lines and/or to detect an effect of the eddy currents on the magnetic field generating device.

8. The play system according to claim 1, wherein the magnetic field generating device comprises a plurality of magnetic field generating lines positioned at respective locations and/or the sensor comprises a plurality of detection lines positioned at respective locations.

9. The play system according to claim 7, wherein the magnetic field generating device comprises a plurality of magnetic field generating lines defining respective predominant magnetic field orientations and/or the sensor comprises a plurality of detection lines defining respective predominant detection orientations.

10. The play system according to claim 9, wherein the one or more magnetic field generating lines and/or the one or more detection lines are arranged on a support structure.

11. The play system according to claim 1, wherein the data processor is configured to create digital play content responsive to the determined physical configuration.

12. The play system according to claim 10, wherein the magnetic field generating lines and/or the detection line are movably arranged relative to a support structure and/or relative to each other.

13. The play system according to claim 1, wherein the sensor is configured to detect the induced eddy currents while the first toy is located within a detection range from the sensor and/or from the magnetic field generating device, the detection range extending to a distance of at least 1 cm from the sensor and/or from the magnetic field generating device.

14. The play system according to claim 1, wherein the data processor is configured to determine a first toy identifier indicative of the first toy based at least in part on the detected spatial pattern.

15. The play system according to claim 1, wherein the data processor is configured to determine respective positions and/or orientations of two or more toys relative to each other based on the detected spatial pattern, the two or more toys being separate from each other and movable relative to each other.

16. The play system according to claim 15, wherein the data processors is configured to control digital play content responsive to the detected positions and/or orientations.

17. The play system according to claim 1, wherein the data processor is configured to detect movement of the first toy based at least in part on the sensor data.

18. The play system according to claim 17, wherein the data processor is configured to control digital play content responsive to the detected movement.

19. A kit of parts for a play system for determining a user-modified configuration and location of a toy built from toy construction elements, the play system comprising:
    a plurality of user-modifiable toy construction elements comprising electrically conductive parts;
    a magnetic field generating device comprising a first and second plane arranged perpendicular to each other, each of the first and second plane projecting a magnetic field from a coil, therefore generating a magnetic field emanating in two dimensions, the magnetic field inducing an eddy current in the electrically conductive parts of the toy construction elements when the toy construction elements are located within the magnetic field;
    a sensor configured to detect the induced eddy current during relative movement between the toy construction elements and the magnetic field generating device; and
    a data processor configured to determine a spatial pattern of the electrically conductive parts based on the detection of the eddy current by the sensor, thereby determining a physical configuration and location of the toy.

20. The play system of claim 19, wherein the data processor is configured to create digital play content responsive to the determined physical configuration and location of the toy.

21. A detectable toy construction set comprising:
    a magnetic field generating device having:
        a first plate; and
        a second plate arranged orthogonal to the first plate, the first and second plate each comprising a magnetic field generating coil, the magnetic field generating coils configured to create a magnetic field projecting out of the first and second plate;
    a toy construction model having a conductive part, the magnetic field inducing eddy currents in the conductive part, a profile of the eddy currents depending on the position and orientation of the conductive part relative to the magnetic field generating device;
    a sensor configured to:
        detect the eddy currents induced in the conductive part; and
        output a sensor signal; and
    a processor configured:
        to receive the sensor signal;
        determine a spatial movement pattern of the conductive part relative to the magnetic field generating device; and
        determine a configuration of the toy construction model.

* * * * *